United States Patent [19]

Dobyns et al.

[11] Patent Number: 4,581,736
[45] Date of Patent: Apr. 8, 1986

[54] MULTIPLE DOWNLINK DATA AGGREGATOR AND SYSTEM

[75] Inventors: Thomas R. Dobyns, Frederick; Tamotsu Inukai, Gaithersburg, both of Md.

[73] Assignee: Communications Satellite Corporation, Washington, D.C.

[21] Appl. No.: 471,367

[22] Filed: Mar. 1, 1983

[51] Int. Cl.⁴ ............................................. H04Q 3/60
[52] U.S. Cl. .................................... 370/92; 370/97; 370/104
[58] Field of Search ...................... 370/92, 104, 84, 93, 370/97, 95, 58

[56] References Cited

U.S. PATENT DOCUMENTS

| | | | |
|---|---|---|---|
| Re. 28,577 | 10/1975 | Schmidt | 370/95 |
| 3,548,108 | 12/1970 | Yamato et al. | 370/95 |
| 3,818,453 | 6/1974 | Schmidt et al. | 370/104 |
| 4,063,038 | 12/1977 | Kaul et al. | 370/92 |
| 4,115,661 | 9/1978 | Schmidt | 370/104 |
| 4,135,059 | 1/1979 | Schmidt | 370/104 |
| 4,145,573 | 3/1979 | Arnold | 370/84 |
| 4,201,892 | 5/1980 | Schmidt | 370/97 |
| 4,204,093 | 5/1980 | Yeh | 370/97 |
| 4,232,266 | 11/1980 | Acampora | 370/97 |
| 4,381,562 | 3/1983 | Acampora | 370/97 |
| 4,397,019 | 8/1983 | Alvarez et al. | 370/104 |

Primary Examiner—Douglas W. Olms
Assistant Examiner—Wellington Chin
Attorney, Agent, or Firm—Sughrue, Mion, Zinn, Macpeak, and Seas

[57] ABSTRACT

In a TDMA satellite communications system with a plurality of transponders and a network of satellite communication controller (SCC) terminals, a data aggregator which may be attached to a local SCC. The data aggregator simultaneously receives TDMA frames from at least two transponders and aggregates locally addressed traffic channels into a TDMA pseudo-frame for delivery to the SCC.

17 Claims, 12 Drawing Figures

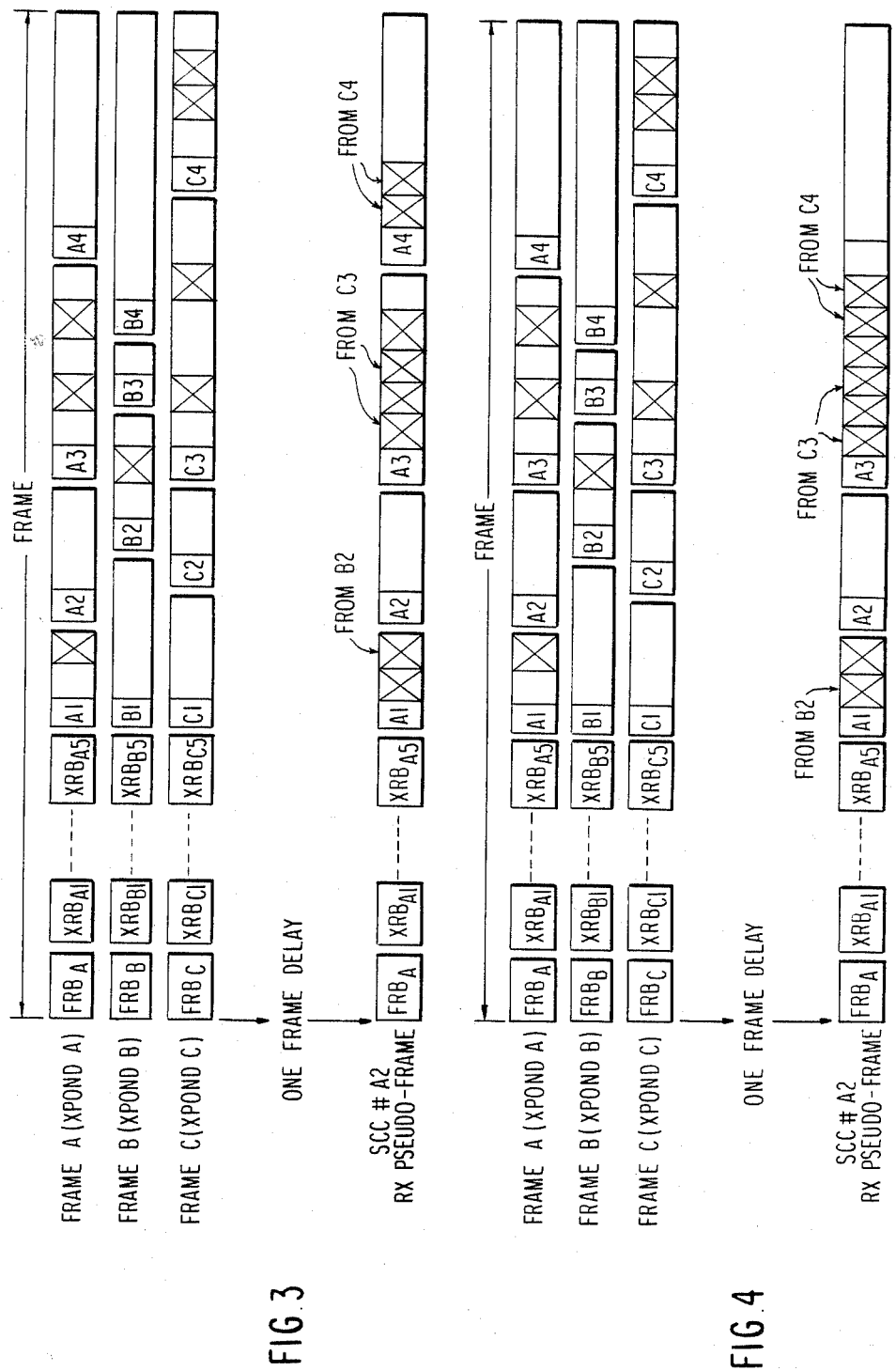

DATA AGGREGATOR BLOCK DIAGRAM

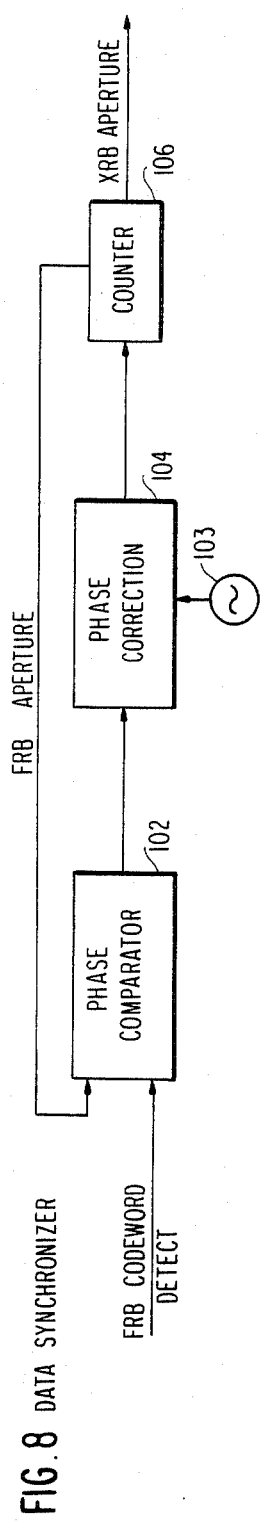
FIG. 8 DATA SYNCHRONIZER
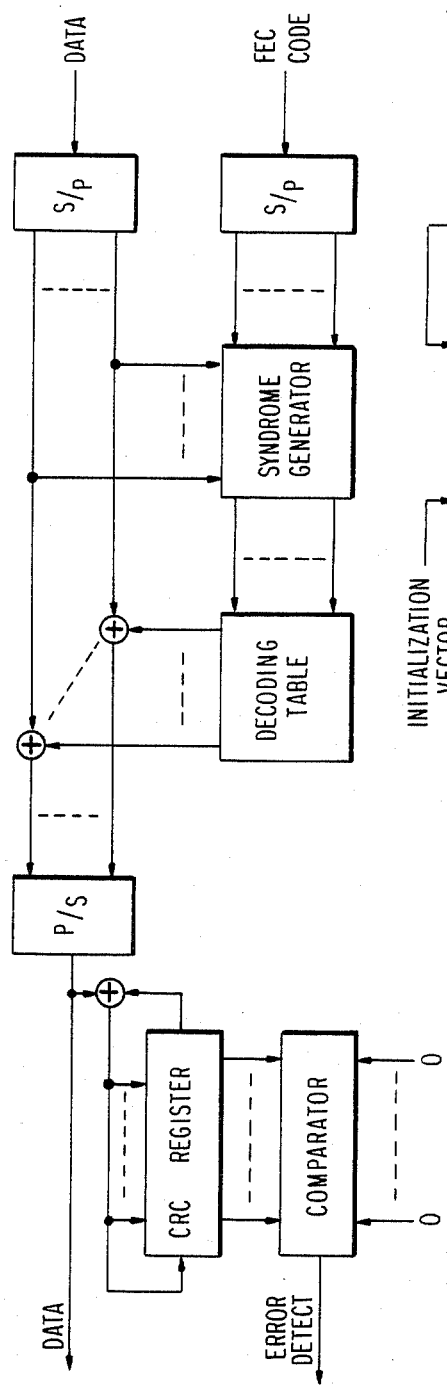
FIG. 9 FEC AND CRC DECODERS
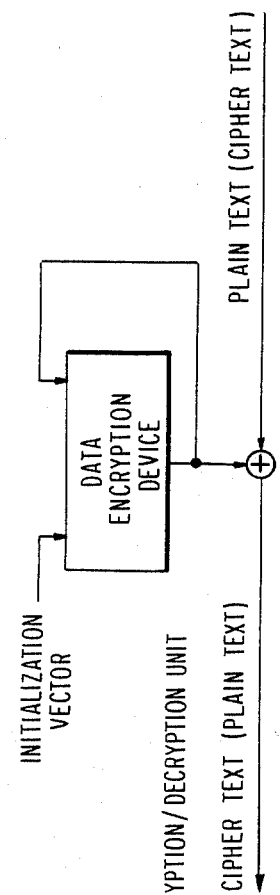
FIG. 10 DATA ENCRYPTION/DECRYPTION UNIT

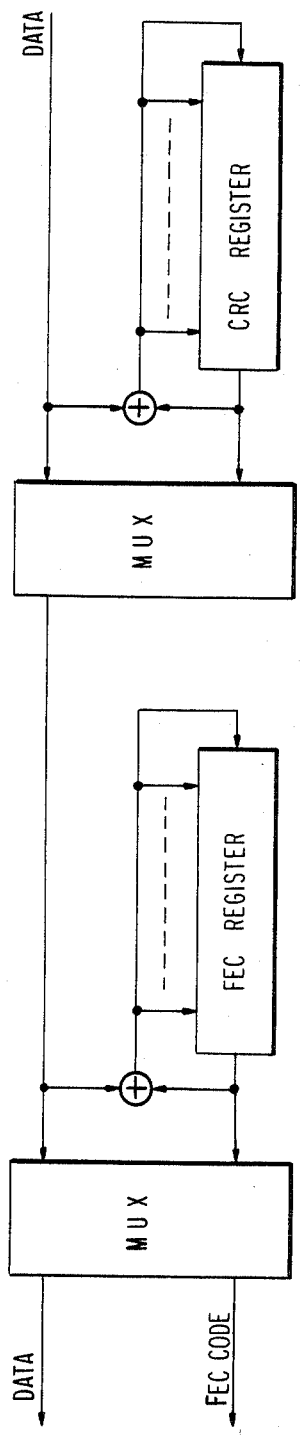
FIG. II FEC AND CRC ENCODERS
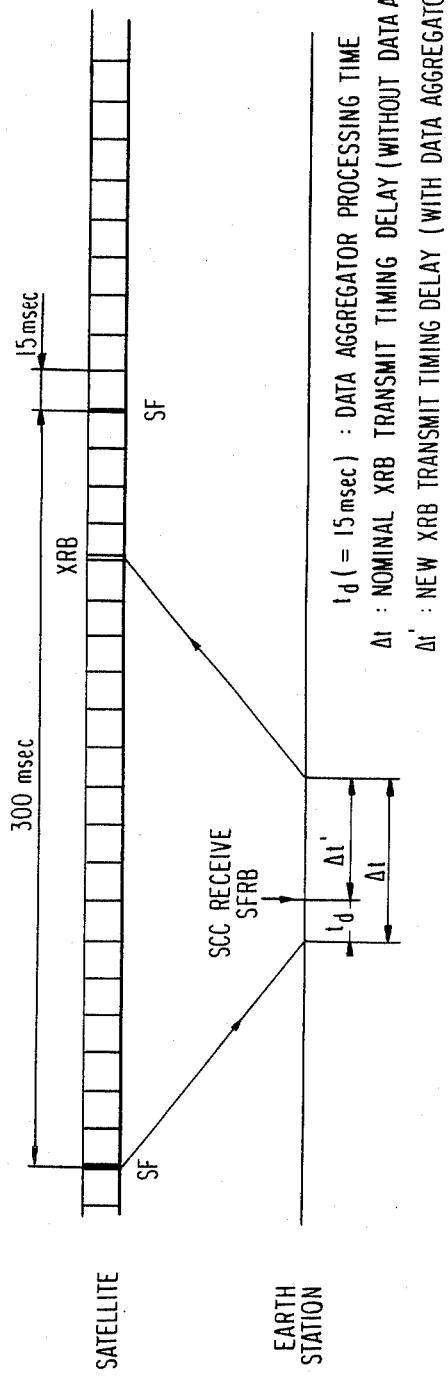
FIG. 12 XRB TRANSMIT TIMING DELAY
$t_d$ (= 15 msec) : DATA AGGREGATOR PROCESSING TIME
$\Delta t$ : NOMINAL XRB TRANSMIT TIMING DELAY (WITHOUT DATA AGGREGATOR)
$\Delta t'$ : NEW XRB TRANSMIT TIMING DELAY (WITH DATA AGGREGATOR)

MULTIPLE DOWNLINK DATA AGGREGATOR AND SYSTEM

BACKGROUND OF THE INVENTION

The invention relates to satellite communications and, more particularly, to a method and apparatus for processing multiple TDMA frames from multiple transponder downlinks.

A typical Satellite Communications Controller (SCC) has sufficient capacity to receive data from a single transponder only. However, as the use of satellite communications increases and satellites become increasingly loaded, it becomes necessary for communications networks to receive data from more than one transponder. Therefore, in order to utilize existing TDMA terminals in a multi-transponder mode, it is an object of the invention to provide an interface between the multiple transponders and the single SCC which will enable the SCC to process data as if it were receiving transmissions from just a single transponder. Preferably, the interface would appear to the SCC as if it were a modem and the use thereof would not require substantial modification to the terminal.

One known technique for engaging multiple transponders in a network is known as "transponder hopping." With transponder hopping, a plurality of stations acting in concert can transmit to or receive from more than a single transponder. The use of transponder hopping is discussed by Schmidt in his U.S. Pat. No. 4,115,661 which issued Sept. 19, 1978, and in his article "The Application of TDMA to INTELSAT IV Satellite Series" which appeared in the COMSAT Technical Review, vol. 3, no. 2, pages 257-75 (Fall 1973). Since one of the main characteristics of transponder hopping is that a plurality of terminals on one side of a downlink communicate with one another, with each of these terminals being able to receive only one downlink at a time, a high degree of burst scheduling must take place so that the communication can be orderly. It is therefore another object of the invention to provide a method of multiple transponder networking which does not require burst scheduling between earth terminals.

SUMMARY OF THE INVENTION

These and other objects of the invention are met by providing a multiple downlink data aggregator between multiple demodulators operating on different transponders and a single SCC-type TDMA terminal. The data aggregator extracts traffic addressed to the local SCC from several downlinks and places it in a single TDMA frame, called a pseudo-frame. The pseudo-frame is then sent to the local SCC which processes it as if it were a single, standard TDMA frame.

The data aggregator includes a separate receive chain for each downlink, with each receive chain having a frame synchronizer. Each synchronizer performs standard TDMA receive-side functions for initial acquisition and steady state synchronization by generating apertures and controlling codeword tolerances. The device includes a frame format processor which receives and decodes FRB (Frame Reference Burst) messages for establishing apertures, and perhaps for forming a pseudo FRB for the pseudo-frame which is supplied to the SCC. This approach further allows each transponder reference station to schedule bursts independently. A result is that burst time planning is greatly simplified and a higher degree of satellite utilization is achieved.

In each of the receive chains, the received signals are provided from the frame synchronizer to an error correcting decoder which error corrects both the traffic channel information and the assignment messages. The corrected assignment messages can then be fed back to the data synchronizer to ensure proper code word aperture generation, etc. Since the SCC is typically designed to monitor the quality of the communications link, the assignment and space signalling messages are also provided to temporary storage buffers without error correction. The encrypted portions of the signal, usually the traffic channels, are then decrypted and the addresses of the traffic channels are examined to determine which of the channels are addressed to the local SCC. The selected traffic channels are stored in ping-pong receive buffers. The selected traffic channels are then multiplexed into a single pseudo-frame together with assignment and space signalling messages. Depending upon the particular desired format of the pseudo-frame, new assignment messages may or may not have to be generated.

The data aggregator according to the present invention is outboard to the SCC and allows the SCC to function in a multi-transponder network with only minor modification.

BRIEF DESCRIPTION OF THE DRAWINGS

The invention will be more clearly understood from the following embodiments and the accompanying drawings, in which:

FIG. 3 is an illustration of a first data aggregation technique, called Channel Stuffing;

FIG. 4 is an illustration of a second data aggregation technique, called Triple Traffic Burst Pseudo-frame;

FIG. 8 is a block diagram of a portion of the data synchronizer of FIG. 7;

FIG. 9 is a more detailed block diagram of essential portions of the FEC and CRC decoders of FIG. 7;

FIG. 10 illustrates essential portions of the data encryption/decryption unit of FIG. 7;

FIG. 11 is a block diagram illustrating essential portions of the FEC and CRC encoders of FIG. 7; and FIG. 12 is a timing chart illustrating XRB transmit timing delays.

DETAILED DESCRIPTION OF THE INVENTION

The present invention is designed primarily for use with SCC-type TDMA terminals, and will be described in that context. However, it should be noted that the data aggregation technique provided by the present invention will be useful as well in other types of communications networks, and the invention is not limited only to use in a satellite communications system.

A basic principle behind the approach taken in the present invention is the realization that an SCC can pass on no more than 13 Mbits/sec of user information. On the other hand, TDMA frames from any one transponder are usually transmitted at a rate of 48 Mbits/sec. Since the SCC is designed to extract 13 Mbits/s from the 48 Mbit/s TDMA frame, the SCC will function satisfactorily if its input is in the form a 48 Mbit/s TDMA frame. It is, therefore, a function of the data aggregator to independently synchronize to each transponder network, to extract traffic addressed to the local SCC from the plurality of transponder frames, to place the selected traffic in a single TDMA frame, hereinafter referred to as a pseudo-frame, and to send the pseudo-frame to the local SCC. The SCC will then treat the pseudo-frame as if it were receiving a single 48 Mbit/s TDMA frame from one transponder.

Figure 1:
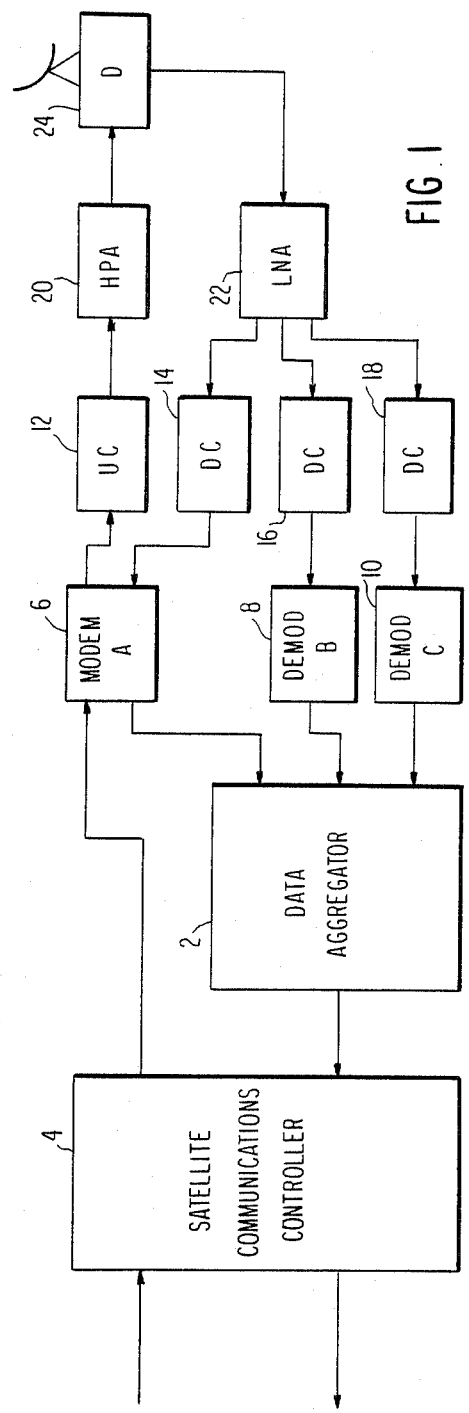
FIG. 1 is a block diagram illustrating the position of a data aggregator according to the present invention within an otherwise conventional system.

In one embodiment of the present invention, shown in FIG. 1, the data aggregator 2 accepts three independent, however loosely synchronous, TDMA frames from three transponders, extracts only desired channels, and aggregates them into one TDMA pseudo-frame for the local SCC 4. More particularly, the satellite communications controller (SCC) 4 first emits a burst through MODEM 6. This signal is up-converted in an up-converter 12, amplified in a high power amplifier 20 and transmitted from earth station 24 to satellite transponder A (XPONDA, not shown). The downside in turn receives bursts from the same transponder and, roughly simultaneously, from transponder B (XPONDB, not shown) and transponder C (XPONDC, not shown). These bursts are down-converted in down-converters 14, 16, and 18, respectively, and passed to the data aggregator 2. The data aggregator 2 performs the above-mentioned function of forming a pseudo-frame by assembling the FRB (frame reference burst), the XRBs (transmit reference bursts), and the traffic channels addressed to the local SCC ports from all the bursts in the three TDMA frames. The aggregation of data into pseudo-frames will be discussed in greater detail with reference to FIGS. 2 through 6.

Figure 2:
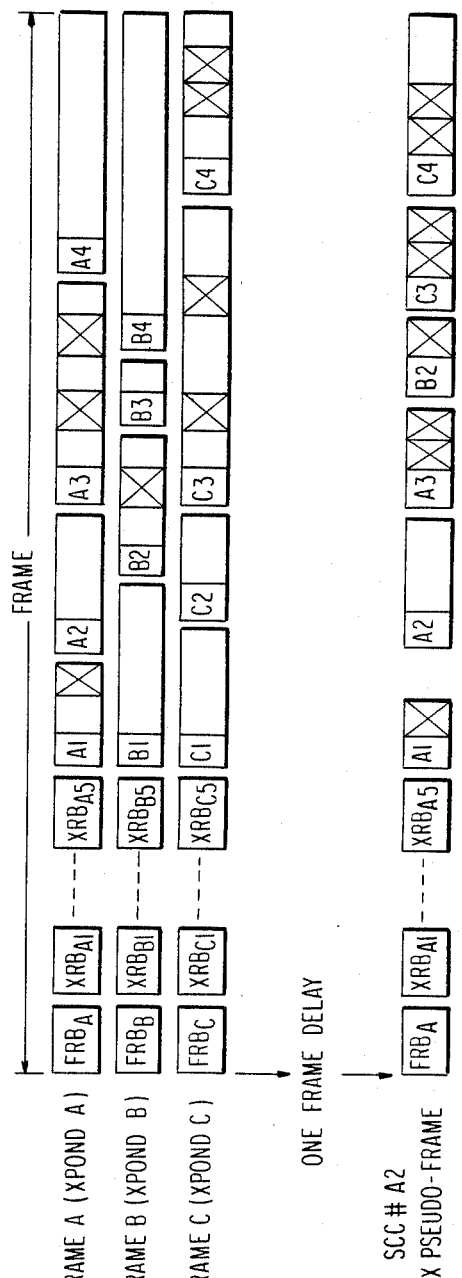
FIG. 2 is an illustration of the data aggregation concept.
Figure 5:
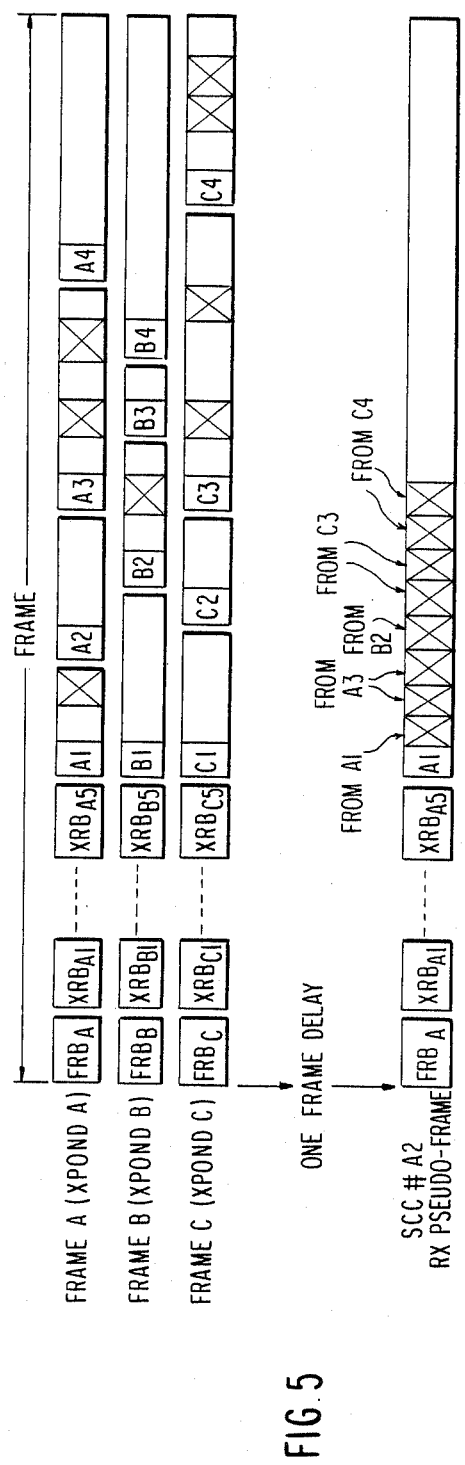
FIG. 5 is an illustration of a third data aggregation technique, called Single Traffic Burst Pseudo-frame.

Assume that a satellite communications controller, arbitrarily designated SCC #A2, has already transmitted a burst to transponder A (XPONDA), and that shortly thereafter transponders A, B and C (XPONDA-XPONDC) have transmitted Frames A-C, respectively, which signals were received by the system of FIG. 1 and demodulated at MODEM A, DEMOD B, and DEMOD C, respectively. FIG. 2 generally illustrates the frame formats received from the various transponders as well as the format of the generated pseudo-frame. The labels A1, A2, A3, etc. are transmit node identification codes (NIDs) indicating the source of each of the respective bursts in frame A received from transponder A, and the NIDs B1-B4 and C1-C4 similarly indicate the sources of the respective bursts in frames B and C received from transponders B and C, respectively. The symbol "X" indicates a channel which is addressed to the SCC number A2. The data aggregator 2 in FIG. 1 examines the frames received from the various transponders and assembles in a single pseudo-frame all of the traffic channels addressed to the SCC #A2. The various techniques for generating the pseudo-frame will be explained with reference to FIGS. 3–6.

In each of FIGS. 3–6, the lines of data labelled FRAME A-FRAME C are illustrated as they might appear following demodulation from their respective modems/demodulators 6, 8, 10 in FIG. 1. These TDMA frames originate from transponders XPONDA-XPONDC, respectively, and each includes a frame reference burst (FRB) of a type well known in the art which contains information indicating where each burst begins, and transmit reference bursts (XRBs) of a type also well known in the art for indicating how many off-hooks there are at each SCC, the reference SCC using this information in the demand assignment algorithm. In each of the different schemes of FIGS. 3–6, the pseudo-frame maintains essentially the same TDMA frame structure as the frame (e.g. FRAME A) which would normally have been received by the SCC #A2, and the pseudo-frame is synchronized to the local SCC receive frame. FRAME A-FRAME C are further comprised of transmit node identification codes (NIDs) A1–A4, B1–B4, and C1–C4, respectively indicating the sources of the various bursts. Traffic channels in each burst addressed to SCC #A2 are designated by an X appearing in the appropriate data stream.

FIG. 3 illustrates a technique referred to as "Channel Stuffing". In this technique, the FRB and XRBs of FRAME A are passed to the SCC #A2 without modification and the data channels addressed to SCC #A2 ports in FRAME B and FRAME C are packed into the channel slots of FRAME A where the original channels were addressed to ports other than SCC #A2. The pseudo-frame consists of exactly the same number and size bursts as in FRAME A, so that the bursts will all start at the same location as in FRAME A, and there is no need to modify the FRB assignment field. Burst #A2, SCC #A2's own burst, may contain traffic channels from other bursts or may be left unchanged depending on the routing procedure of the SCC port traffic. Since each burst may contain traffic channels from other frames, the SCC may not be able to identify the originating node of the channels. If the SCC requires the burst NID in processing received channels, it may interface with the data aggregator where all the necessary information would be available.

FIG. 4 illustrates a further aggregation technique which may be called "Triple Traffic Burst Pseudo-frame". In addition to the FRB and XRBs of Frame A, the pseudo-frame in FIG. 4 consists of three traffic bursts, one of which is from SCC #A2 located in the same position as in Frame A. All the data channels addressed to SCC #A2 ports are merged into two bursts A1 and A3, and the SCC #A2 burst remains unchanged. This configuration requires different transmit and receive frame compositions, and the data aggregator must create a new FRB having new burst assignments for SCC #A2 according to the new burst positions and lengths. As in the case discussed above, the NIDs may be obtained from the aggregator if the SCC needs them for routing purposes.

In the previous two aggregation methods, the burst position of the SCC #A2 burst is preassigned for every pseudo-frame so that the timing information for this burst is directly derived from the assignment table. However, the technique of FIG. 5, which may be called "Single Traffic Burst Pseudo-Frame" makes it possible for the aggregator to generate a single traffic burst if some modifications of the SCC software/hardware are allowed. Here, the pseudo-frame consists of the FRB and XRBs from FRAME A, but all valid SCC port channels are assembled in one traffic burst under the node A1.

The burst A1 in the pseudo-frame will begin at the same location as the burst A1 in the frame A. The FRB from FRAME A will therefor correctly indicate the starting position of the burst and, since the SCC can ignore all subsequent assignments in the FRB, the control fields of FRAME A can be passed to SCC #A2 without modification. The assignment table obtained by the SCC can then be used only for transmit timing purposes. With this method, simpler pseudo-frame generation and higher data concentration can be achieved.

Figure 6:
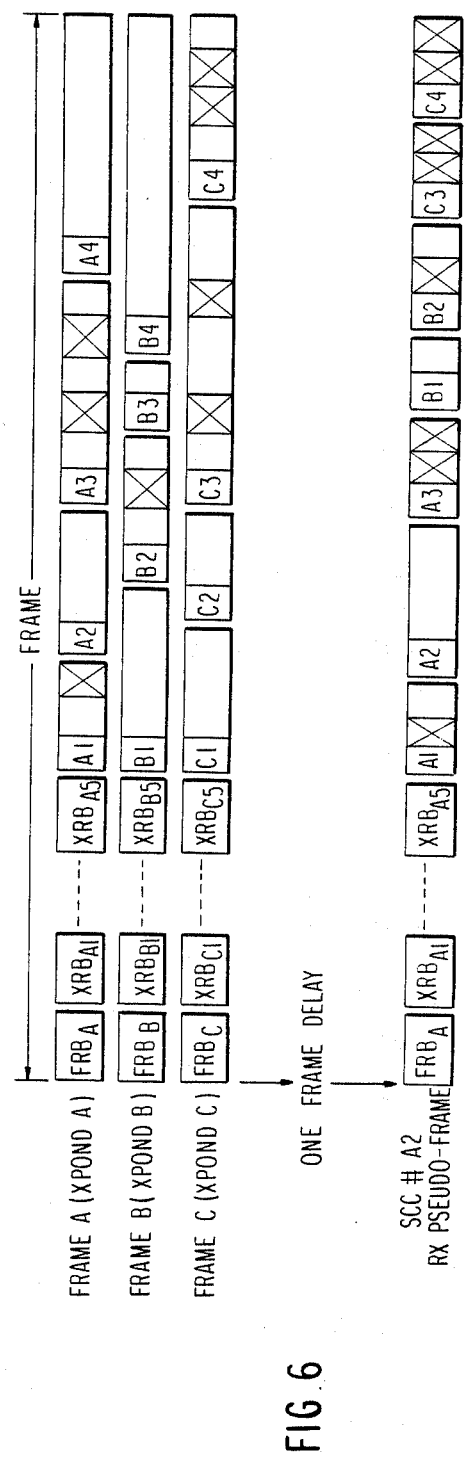
FIG. 6 is an illustration of a fourth data aggregation technique, called Preassigned Burst Stuffing.

Another data aggregation technique, with less impact on current SCC designs, although less efficient, is the allocation of a traffic burst slot in the pseudo-frame for each desired burst from three transponders. This may be called "Preassigned Burst Stuffing". As shown in FIG. 6, each traffic burst destined to the SCC #A2 ports is packed by deleting unwanted channels and is placed in the preassigned pseudo-frame burst slot. The NIDs remain unchanged in the pseudo-bursts. The SCC #A2 burst position and length are also unchanged, thus requiring that the length and position of the SCC #A1 burst also remain unchanged.

The drawbacks of this method are that the data aggregator has to have advance knowledge of the maximum traffic from each SCC destined to SCC #A2, and that the maximum allocated traffic may exceed the capacity of one frame. However, an advantage is that the SCC can identify the transmit nodes of traffic channels without having to retrieve this information from the aggregator.

Although the invention should not be construed as limited to this embodiment, a specific embodiment of the data aggregator will now be presented.

Figure 7:
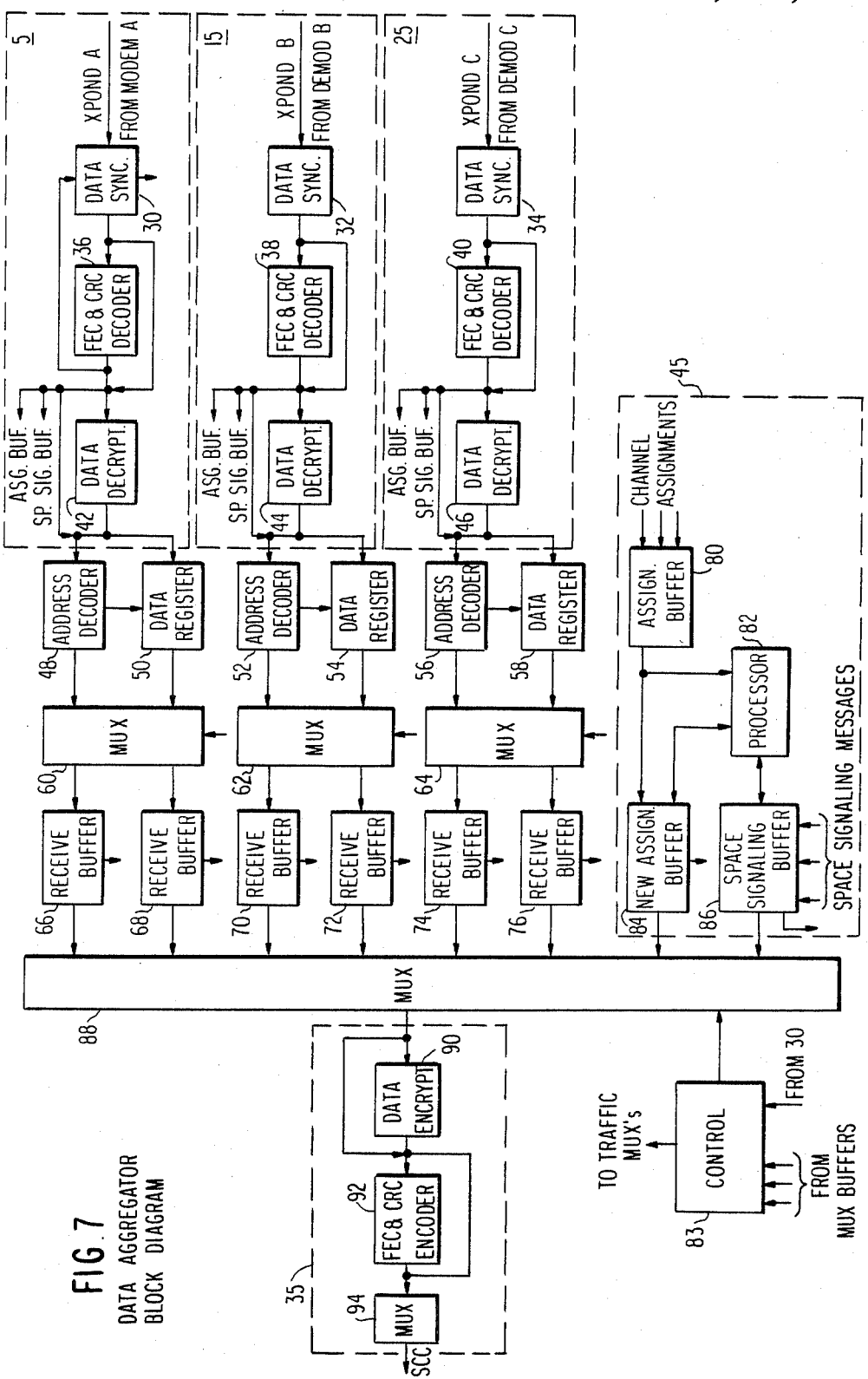
FIG. 7 is a block diagram of a data aggregator according to the present invention.

A block diagram of one example of the data aggregator is shown in FIG. 7. The basic building blocks are triplicated SCC receive chains 5, 15, 25, address decoders 48, 52, 56 and data registers 50, 54 and 58 to extract desired traffic channels, alternate receive buffers 66-76 for channel/burst multiplexing, and a single transmit chain 35 to generate a pseudo-frame. In the figure, it is assumed that each SCC includes data encryption and decryption devices. The function of each unit will now be described in greater detail.

The data synchronizers 30-34, which are known in the art, perform the receive clock synchronization with the FRBs and provide codeword apertures to the demodulator. Since the aggregator does not have transmit functions, it is not necessary to generate transmit timings as in a standard synchronizer. The data synchronizers operate in a manner well known in the art, and the XRB aperture signals for receiving each of the XRBs are generated in a well-known manner such as illustrated in FIG. 8. A frame reference burst code word is detected and the phase of the FRB detection signal is compared with a locally generated FRB aperture signal in a phase comparator 102. In accordance with the phase comparison signal, the phase of the oscillator signal from local oscillator 103 is corrected in a phase correction circuit 104 and provided to a counting means 106 which is used to generate the FRB aperture signal and XRB aperture signals synchronized to the FRB aperture signal. The design and operation of data synchronizers are well known in the art, and the data synchronizers will obviously include many additional components. The diagram of FIG. 8 is provided merely to illustrate the basic synchronization technique which may be employed.

As is typical, an FEC (Forward Error Correction) and CRC (Cyclic Redundancy Code) detector are used for decoding the received signals. Since the SCC may be designed to monitor the occurrence of errors in order to determine the quality of the communications link, the assignment and space signalling messages must be provided to the SCC without error correction, and these are stored in temporary buffers 82 and 86. However, since the aggregator requires the assignment messages to construct an assignment table used for the code word aperture generation for traffic bursts, for channel assembly and for creating a new assignment table for the SCC in some situations, the assignment messages and preferably the space signalling messages as well are error corrected together with the data fields, and error corrected information necessary for synchronization functions can be fed back to the synchronizers. The essential components of a typical FEC and CRC decoder are illustrated in FIG. 9.

The channel assembly and new assignment table are implemented in a control section 45. The original assignment messages without error correction are provided from each of the received chains to a channel assignment buffer 80, and the space signalling messages are provided from each of the received chains to a space signalling buffer 86. The five successive XRBs are stored in sequence in the buffer 86 as they arrive, and the processor 82 monitors the contents of the assignment buffer 80 and generates new channel assignment information in the new assignment buffer 84, some or all of which information may merely be passed from the original assignment buffer 80.

The data aggregator contains three independent data decryption devices 42-46, since each network may use a unique key which is updated once in every superframe. FIG. 10 illustrates the basic and well-known operation of a standard decryption unit. The triplicated decryption is necessary for generating an unencrypted pseudo-frame from independently encrypted frames. Decryption is typically performed on the data field only, with the address field being passed around the decryption device to the address decoder.

Every channel address is fed into an address decoder 48, 52 or 56 and the following data or signalling channel information is read into a data register 50, 54 or 58. If the channel address matches one of the local SCC port numbers, the contents of the address and data registers are transferred to one of receive buffers 66-76; otherwise, they are discarded.

Each receive chain has two receive buffers, e.g. receive chain A has buffers 66 and 68, each with 22.5 Kbytes of memory. The alternate buffer structure makes it possible to write data on one buffer while the other buffer is being read by the channel multiplexer 88.

All the buffer contents are now multiplexed by multiplexer 88 under control of controller 83 to form a pseudo-frame, and the data channels are reencrypted in data encrypter 90. Some portion of the bursts may need to be encoded in encoder 92, for instance when a new assignment table is created by the data aggregator. FIG. 11 portrays a standard FEC and CRC encoding configuration.

Some current SCC design plans assume that the data encryption is to be performed within the SCCs. However, this fact obligates the data aggregator to include both encryption and decryption devices—resulting in six encryption/decryption units for each SCC with aggregation. This number may, however, be reduced to four if the decryption function of the SCC is transferred to the data aggregator as shown. For system modularity purposes, the encryption unit 90 in the transmit chain may also be transferred to the aggregator so that the aggregator performs all the encryption and decryption functions.

The pseudo-frame delay timing considerations will now be discussed.

Each TDMA frame received by the data aggregator experiences one frame of delay to reach the SCC due to the channel assembly in the aggregator. The SCC derives its burst transmit timing from the delayed superframe reference burst. Since SCCs without data aggregators will not undergo this delay, there will be one frame of timing difference between the SCCs with and the SCCs without the data aggregator. The situation is illustrated in FIG. 12, where $\Delta t$ is the nominal XRB transmit timing delay after the reception of the superframe reference burst SFRB absent aggregation. If the SCC with aggregation transmits its burst based on delay $\Delta t$, it reaches the satellite one frame later than its nominal position, which results in a collision with another XRB. However, this collision can be avoided by transmitting the XRB one frame earlier than its nominal delay. Therefore, it is necessary to change the SCC transmit timing procedure by one frame time. It should be noted that if $\Delta t$ is less than 15 msec, the new transmit timing delay $\Delta t'$ becomes 300 msec−15 msec+$\Delta t$.

In addition to normal operations, the data aggregator must support the interface and IF Loopback Configuration as selected via the Monitor/Control system. In the interface loopback configuration, the reference modem will perform an interface wrap and the data aggregator will connect the modem signals directly to the corresponding lines at the SCC interface. In the IF Loopback mode, the data aggregator will be configured as in the Interface Wrap, therefore all control logic will be passed and signal lines will be connected directly between the modem and the SCC.

In the Interface and IF Loopback Modem, non-reference transponders will not transfer traffic to the SCC, however, the data aggregator will maintain synchronization with the transponder network.

The unit should also contain an apparatus for testing non-reference modems.

The extraordinary nature of the present invention is magnified by the fact that it requires so little modification to existing equipment. This benefit was achieved as a direct result of a design effort aimed at enhancing the capability of existing equipment with an innovative conglomeration of data structuring and hardware/software design.

We claim:

1. A communications system of the type having at least one receiving station having receiving means for receiving an information signal including data and address information and forwarding at least a portion of said data to at least one destination, said system further comprising a plurality of information transmitters for transmitting transmitted signals to said receiving station, and aggregator means at said receiving station for receiving said transmitted signals from each of said transmitting stations, selecting from said transmitted signals portions thereof addressed to said at least one destination, combining said selected portions into said information signal, and forwarding said information signal to said receiving means.

2. A communications system as defined in claim 1, wherein said receiving means is capable of receiving information at no more than a first maximum rate, and the combined rate of said plurality of transmitted signals exceeds said first maximum rate.

3. A communications system as defined in claim 2, wherein said receiving means is capable of forwarding information to said at least one destination at no more than a second maximum rate, said second maximum rate being less than said first maximum rate.

4. A communications system as defined in claim 1, wherein said at least one destination comprises a plurality of destinations.

5. A communications system as defined in claim 4, said communications system comprising a satellite communications system, said transmitting stations comprising satellite transponders and said receiving means comprising a satellite communications controller (SCC).

6. A satellite communications system as defined in claim 5, wherein said transmitted signals each comprise time division multiple access (TDMA) signals having successive frames and being transmitted at a frame rate, said information signal comprising a TDMA signal having said frame rate.

7. A satellite communications system as defined in claim 5, wherein each of said transmitted signals is a time division multiple access (TDMA) signal having successive frames, each frame comprising a plurality of bursts and a frame reference burst indicating the starting positions of each of said plurality of bursts within said frame, each burst including a plurality of channels having an address field and a data field, said aggregator means examining said address fields in each channel of each burst in each of the transmitted signals and selecting those channels having an address designating one of said plurality of destinations, said aggregator means generating as said information signal a TDMA pseudo-frame signal having a plurality of bursts and a frame reference burst indicating the starting positions of each of said plurality of bursts in said pseudo-frame signal.

8. In a satellite communications system of the type having a plurality of TDMA terminals each serving a plurality of destinations for transmitting bursts of information signals, each burst including a plurality of channels addressed to different ones of said destinations, a plurality of transponders for receiving said bursts and each transmitting to said TDMA terminals a TDMA frame signal including bursts from said plurality of TDMA terminals, the improvement comprising at least one data aggregator means for concurrently receiving said TDMA frame signals from said plurality of transponders, selecting from each TDMA frame signal those channels addressed to destinations served by said one terminal, forming a new TDMA frame signal including the selected channels, and forwarding said new TDMA frame signal to said one terminal.

9. A satellite communications system as defined in claim 8, wherein one of the TDMA frame signals received by said one TDMA terminal from one of said plurality of transponders includes at least one burst transmitted by said first TDMA terminal, said one burst having a starting position and occupying a length within said one frame signal, the starting position and length of said burst in said new frame signal being the same as in said one frame signal.

10. In a communications system as defined in claim 9, the improvement further characterized in that said plurality of TDMA signals includes first through third signals with said one TDMA frame signal comprising said first signal, said first through third TDMA signals having first through third frames, respectively, and said aggregator means forms said new TDMA frame signal by selecting channels from said second and third frames which are addressed to said first TDMA terminal and inserting said selected channels into slots in said first frame which are not occupied by channels addressed to said one TDMA terminal, the number and duration of the bursts in said new TDMA frame signal being the same as in said first TDMA frame signal.

11. A satellite communications system as defined in claim 8, wherein said new TDMA frame includes only a single burst containing selected channels from a plurality of bursts in said plurality of TDMA frame signals.

12. A satellite communications system as defined in claim 9, wherein said new frame signal includes only a single burst after said one burst, said single burst including channels selected from each of said plurality of TDMA frame signals.

13. A satellite communications system as defined in claim 9, wherein said new TDMA frame signal includes a fixed predetermined number of bursts.

14. A satellite communications system, comprising:
a local satellite communications terminal having an input for receiving a TDMA frame;
a plurality of transponders;
at least two receiving means for concurrently receiving TDMA frames from different ones of said plurality of transponders, each of said TDMA frames including traffic channels addressed to said local satellite communications terminal; and
data aggregating means receiving said TDMA frames from said receiving means and selecting from each of said TDMA frames traffic channels addressed to said local satellite communications terminal, said aggregating means combining said selected traffic channels into a single new TDMA frame signal and applying said new TDMA frame signal to said input of said local satellite communications terminal.

15. A satellite communications system as defined in claim 14, wherein said data aggregating means includes decryption means in each of said receiving means for decrypting said TDMA frame signals, and encryption means for encrypting at least a portion of said new TDMA frame signal.

16. A data aggregator for use in a multiple transponder satellite communications system, said data aggregator comprising: at least two receiving means for receiving TDMA frame signals from respective ones of said multiple transponders, each of said frame signals including a plurality of channels; selecting means for selecting desired traffic channels from each of said TDMA frame signals; and means for combining said selected traffic channels into a new TDMA frame signal.

17. A method of communication between a plurality of TDMA terminals each having an input, comprising the steps of:
transmitting bursts from each of at least first, second and third terminals, each of said bursts including traffic channels addressed to different ones of said terminals;
receiving said bursts at at least first, second and third transponders and transmitting from said transponders first, second and third TDMA frame signals, respectively, each including a plurality of bursts;
concurrently receiving each of said first, second and third TDMA frame signals at said first TDMA terminal;
selecting traffic channels from said first, second and third frame signals addressed to said first TDMA terminal;
combining said selected traffic channels into a new TDMA frame signal; and
providing said new TDMA frame signal to the input of said first TDMA terminal.

* * * * *